Feb. 21, 1961   V. E. LINDSTRAND   2,972,212
METHOD OF MAKING GLASS HOLLOW WARE
Filed March 11, 1957
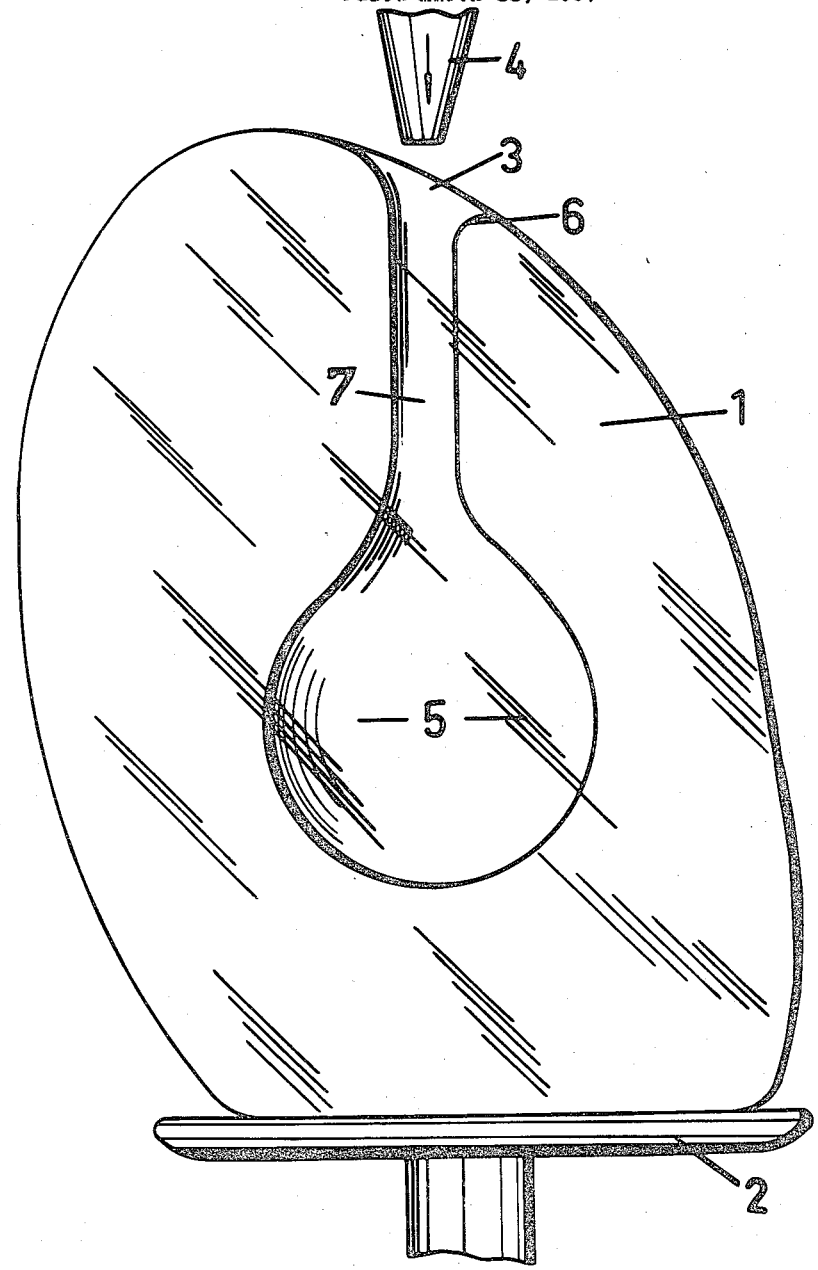

2,972,212
METHOD OF MAKING GLASS HOLLOW WARE
Viktor Emanuel Lindstrand, Kosta, Sweden, assignor to Aktiebolaget Kosta Glasbruk, Kosta, Sweden, a corporation of Sweden
Filed Mar. 11, 1957, Ser. No. 645,076
Claims priority, application Sweden Mar. 13, 1956
3 Claims. (Cl. 49—80)

This invention relates to a method of making glass hollow ware which differs fundamentally from the ancient method of blowing glass with a blowpipe and which results in hollow ware of an entirely new character.

The method according to the invention comprises gathering or pouring a mass of molten glass, making a recess at one or more optionally selected spaced points, and freely directing a gas jet towards said recess or each of said recesses, said gas jet penetrating into the mass of glass and producing one or more hollows therein.

The invention will be described more in detail in the following, reference being had to the accompanying drawing which illustrates a piece of hollow ware being made by the method according to the invention.

The single figure of the drawing illustrates, by way of example, a body of hot plastic glass 1, shown in vertical section, supported on a punty 2, in the ultimate stage of producing a cavity therein according to the present invention. The illustrated body may or may not be subjected to subsequent fashioning procedure supplementing the method illustrated, as explained below.

Referring to the drawing, in the form of the method according to the invention by which the illustrated piece of hollow ware 1 is made, a solid mass of molten glass is gathered from the glass furnace crucible and applied to the punty 2. A recess is made at 3 in the mass of glass with a suitable tool, and a nozzle 4 is placed opposite said recess, a jet of gas, e.g. air, under pressure being directed through said nozzle towards said recess. At this time the surface layer of the mass of glass has already cooled somewhat and has thereby acquired increased toughness. In the recess, however, the glass is still hot and soft. When the gas jet hits the innermost portion of the recess, the glass yields. The nozzle can be held in the immediate vicinity of the glass or at some distance therefrom depending on the shape that the mass of glass is intended to assume around the original recess. The gas, which initially is cold, penetrates further into the glass, forming a channel 7, and then greatly expands by reason of the heat from the mass of glass, whereby the latter is blown up to form an expanded cavity 5 and is converted entirely automatically into the hollow article 1.

Depending on the quantity of gas supplied, the time at which the gas is supplied during the cooling of the mass of glass, and the point on the surface of said mass towards which the jet is directed, different results are attained. The suggested method therefore affords rich possibilities of giving the glass an inner or outer shape which is more varied than that obtainable in the ordinary glass blowing technique. In conventional blowing, with or without a subsequent fashioning of the glass, one cannot for instance provide such deviation as shown in the drawing, from the spontaneously adopted shape of the gathered mass of glass. Nor is it possible to produce the smooth, gently rounded transition 6 at the mouth in a hollow bulb blown with a blowpipe, without expending much skillful labor.

As already stated, the hollow article 1 obtained is not always a finished product but can be subjected to further treatment. For instance, the relatively "closed" hollow article 1 can be opened, it being, inter alia, possible to obtain an unsymmetrical open shape with varying wall thickness, contrary to what is the case in blown ware where the wall of a bulb or bowl is of uniform thickness.

The method described in the foregoing also presents advantages from the viewpoint of saving labor in that the glass is always worked from the same direction, i.e. it is not transferred from the blowpipe to the punty as in blowing, thus dispensing with an entire working step. Finally, an important advantage is that the marks that are visible in all ordinary blown glass at the bottom of the relatively thick lower portion of the glass and which result from the successive gathering of the different glass layers, practically disappear.

The method can be varied in several respects. It can be used for instance to provide a plurality of air bubbles on a glass blown with a blowpipe, said air bubbles being either open or closed at the other side to form an air pattern. In this case, the gathered mass of glass is first blown in the ordinary manner, and while the glass is still hot or possibly after being heated, recesses are made at optional points of the surface of the blown shape, whereupon gas jets are directed towards said recesses, as has been described above.

In another form of the method the glass is poured from the crucible into a metal mold instead of being applied to a punty, and at the upper exposed surface of the mass of glass a recess is then made, towards which a jet of gas under pressure is directed. The mass of glass is then converted into a piece of hollow ware in the same way as described above.

What I claim and desire to secure by Letters Patent is:
1. The method of making glass hollow ware which comprises preparing a body of glass in a hot plastic state with an exposed surface which is harder and less plastic than the glass inwardly thereof, forming an opening through said surface, and directing a jet of gas from a nozzle spaced from said body through said opening into said hot plastic body of glass to form a cavity therein inwardly of said surface while leaving said surface free to expand.

2. The method of making a glass body having an opening in its surface leading into a cavity in said body, comprising placing a mass of molten glass upon a support, the exposed surface of said mass above said support being unconfined, causing said exposed surface to harden slightly, piercing said exposed surface to form a recess in said mass, and directing a jet of gas from a nozzle spaced from said mass into said recess to form a cavity in said glass inwardly of said surface while leaving said exposed surface free to expand.

3. A method of making glass hollow ware comprising applying a mass of molten glass to a handling tool, allowing the surface layer of said mass of glass, while maintained in an unconfined condition, to cool and harden slightly, piercing said surface layer at a selected point to form a recess in said glass mass, blowing a jet of gas from a nozzle spaced from said recess into said recess to form a channel extending inwardly from said recess, and continuing to blow said gas through said channel to produce an enlarged cavity in said glass mass inwardly of said surface layer, said cavity being wider than said channel.

References Cited in the file of this patent

UNITED STATES PATENTS

| | | |
|---|---|---|
| 237,371 | Dean et al. | Feb. 8, 1881 |
| 389,595 | Reder | Sept. 18, 1888 |
| 1,272,862 | Sanford | July 16, 1918 |
| 1,482,789 | Gmelin | Feb. 5, 1924 |
| 1,635,716 | Howard | July 12, 1927 |
| 1,894,100 | Kodow | Jan. 10, 1933 |

FOREIGN PATENTS

| | | |
|---|---|---|
| 310,421 | Great Britain | Feb. 27, 1930 |
| 701,732 | Germany | Jan. 22, 1941 |